US011991227B2

(12) United States Patent
Kolati et al.

(10) Patent No.: US 11,991,227 B2
(45) Date of Patent: May 21, 2024

(54) METHOD AND DEVICE FOR CONTROLLING VIDEO RECEPTION (71) Applicant: SAMSUNG ELECTRONICS CO., LTD., Suwon-si (KR)

(72) Inventors: Naveen Kolati, Karnataka (IN); Nishant Gupta, Uttar Pradesh (IN); Shah Sapan Pramodkumar, Bangalore (IN); Vinayak Goyal, Rajasthan (IN); Shiva Prasad Chanduri, Bengaluru (IN); Siva Prasad Gundur, Bangalore (IN); Arunjith Govindankutty, Kerala (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/805,424

(22) Filed: Jun. 3, 2022

(65) Prior Publication Data
US 2022/0303325 A1 Sep. 22, 2022

Related U.S. Application Data (63) Continuation of application No. 16/792,795, filed on Feb. 17, 2020, now Pat. No. 11,368,507.

(30) Foreign Application Priority Data

Feb. 16, 2019 (IN) .............................. 201941006185
Feb. 7, 2020 (IN) .............................. 201941006185

(51) Int. Cl.
G06F 15/16 (2006.01)
H04L 5/00 (2006.01)
(Continued)

(52) U.S. Cl.
CPC ............ *H04L 65/60* (2013.01); *H04L 5/0055* (2013.01); *H04W 76/10* (2018.02); *H04W 76/30* (2018.02); *H04W 4/90* (2018.02)

(58) Field of Classification Search
CPC ...... H04L 65/60; H04L 5/0055; H04W 76/30; H04W 76/10; H04W 4/90
(Continued)

(56) References Cited

U.S. PATENT DOCUMENTS 5,859,979 A 1/1999 Tung et al.
8,094,647 B2 1/2012 Elliott et al.
(Continued)

FOREIGN PATENT DOCUMENTS

CN 101217702 A 7/2008
EP 3379852 A1 9/2018
(Continued)

OTHER PUBLICATIONS

"3rd Generation Partnership Project; Technical Specification Group Core Network and Terminals; Mission Critical Video (MCVideo) media plane control; Protocol specification (Release 16)", 3GPP TS 24.581 V16.0.0 (Dec. 2018), 201 pages.
(Continued)

Primary Examiner — Bharat Barot (57) ABSTRACT

A method for controlling media reception at an electronic device communicating with at least one external device includes establishing a communication session between the electronic device and the at least one external device via a server; in response to establishing the communication session, creating an instance of a first reception control state machine for controlling multiple media receptions in the communication session; receiving, from the server, a media transmission notification indicating that a media reception is available from an external device; receiving, from a user of
(Continued)

the electronic device, an input for permitting the media reception; and in response to receiving the input, transmitting a media reception request requesting the media reception to the server and creating an instance of a second reception control state machine for controlling the media reception.

16 Claims, 7 Drawing Sheets

(51) Int. Cl.
  *H04L 65/60* (2022.01)
  *H04W 76/10* (2018.01)
  *H04W 76/30* (2018.01)
  *H04W 4/90* (2018.01)

(58) Field of Classification Search
  USPC .................................. 709/217–219, 227–229
  See application file for complete search history.

(56) References Cited

U.S. PATENT DOCUMENTS

| | | | |
|---|---|---|---|
| 8,760,492 B2* | 6/2014 | Halavy | H04N 7/152 |
| | | | 348/14.09 |
| 11,368,507 B2* | 6/2022 | Kolati | H04L 65/60 |
| 2008/0267213 A1* | 10/2008 | Deshpande | H04N 21/4621 |
| | | | 370/468 |
| 2010/0250805 A1 | 9/2010 | Cohen et al. | |
| 2012/0143699 A1 | 6/2012 | Moon et al. | |
| 2013/0091291 A1 | 4/2013 | Liu | |
| 2013/0212166 A1* | 8/2013 | Willig | H04L 65/612 |
| | | | 709/228 |
| 2013/0282868 A1* | 10/2013 | Chung | H04L 65/80 |
| | | | 709/219 |
| 2014/0013363 A1 | 1/2014 | Chang et al. | |
| 2014/0108568 A1* | 4/2014 | Lee | H04L 65/4015 |
| | | | 709/227 |
| 2014/0240445 A1 | 8/2014 | Jaynes | |
| 2016/0286254 A1* | 9/2016 | Hirose | H04N 21/23113 |
| 2017/0223079 A1* | 8/2017 | Liu | H04L 65/613 |
| 2017/0289776 A1 | 10/2017 | Kim et al. | |
| 2017/0374109 A1 | 12/2017 | Atarius et al. | |
| 2018/0035482 A1 | 2/2018 | Shibuya | |
| 2018/0097850 A1 | 4/2018 | Baek et al. | |
| 2018/0242120 A1 | 8/2018 | Baek et al. | |
| 2019/0334969 A1* | 10/2019 | Ge | H04L 65/764 |
| 2019/0342349 A1* | 11/2019 | Belling | H04L 65/1043 |
| 2020/0099789 A1* | 3/2020 | Miller | H04L 65/1063 |
| 2020/0204517 A1* | 6/2020 | Daun | H04L 67/51 |

FOREIGN PATENT DOCUMENTS

| | | |
|---|---|---|
| KR | 10-2016-0005315 A | 1/2016 |
| WO | 2016077716 A1 | 5/2016 |
| WO | 2018/062940 A1 | 4/2018 |

OTHER PUBLICATIONS

European Patent Office, "Supplementary European Search Report" dated Feb. 28, 2022, in connection with European Patent Application No. 20756203.4, 9 pages.
International Search Report and Written Opinion of the International Searching Authority in connection with International Application No. PCT/KR2020/002198 dated May 27, 2020, 11 pages.
Office Action dated Oct. 27, 2021 in connection with Indian Patent Application No. 201941006185, 5 pages.
European Patent Office, "Communication under Rule 71(3) EPC" dated Jun. 2, 2023, in connection with European Patent Application No. 20756203.4, 43 pages.
Office Action dated Dec. 18, 2023, in connection with Chinese Patent Application No. 202080014788.5, 23 pages.
Notice of Allowance dated Oct. 4, 2023, in connection with European Patent Application No. 20756203.4, 42 pages.
European Search Report dated Feb. 7, 2024, in connection with European Patent Application No. 24152820.7, 9 pages.

* cited by examiner

METHOD AND DEVICE FOR CONTROLLING VIDEO RECEPTION

CROSS-REFERENCE TO RELATED APPLICATIONS

This application is a continuation of application Ser. No. 16/792,795, now U.S. Pat. No. 11,368,507 issued Jun. 21, 2022, which is based on and claims priority under 35 U.S.C. § 119 to Indian Patent Application No 201941006185 filed on Feb. 16, 2019 and Indian Patent Application No. 201941006185 filed on Feb. 7, 2020 in the Indian Patent Office, the disclosures of which are incorporated by reference herein in their entireties.

BACKGROUND

1. Field

The disclosure relates to wireless communication networks, and more specifically related to a mission critical video communication offered over the wireless communication networks. More particularly it is related to a method and system for controlling video reception in a mission critical (MC) video network.

2. Description of Related Art

Mission Critical refers to meeting the needs of agencies providing Public Safety services such as, but not limited to, Police, Fire and Ambulance services. Those needs include high reachability, availability and reliability of the service, low latency, real-time operating capabilities, highly secured operations, inter-operability with other services and systems, private and group communications, handling of emergencies and ability to provide prioritization, pre-emption, queuing and quality of service (QoS).

Mission Critical video (MCVideo) defines a service for Mission Critical video communication. In MCVideo systems, there can be multiple clients transmitting video and audio streams simultaneously. Consequently, a MCVideo client providing the client application function for the MCVideo service should be able to receive more than one media (audio & video) stream simultaneously. But the existing system, state machine for reception control operation doesn't handle multiple stream reception scenarios. Further, the simultaneous receptions of multiple media streams have complications in handling of the received media streams at the MCVideo client. Further, there is no existing system to accept/reject/end multiple media streams in the same group/session.

Thus, it is desired to address the above mentioned disadvantages and other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of providing an intelligent response on an electronic device.

Additional aspects will be set forth in part in the description which follows and, in part, will be apparent from the description, or may be learned by practice of the presented embodiments.

Accordingly, provided is a method for controlling media reception at an electronic device communicating with at least one external device. The method comprises establishing a communication session between the electronic device and the at least one external device via a server; in response to establishing the communication session, creating an instance of a first reception control state machine for controlling multiple media receptions in the communication session; receiving, from the server, a media transmission notification indicating that a media reception is available from an external device; receiving, from a user of the electronic device, an input for permitting the media reception; and in response to receiving the input, transmitting a media reception request requesting the media reception to the server and creating an instance of a second reception control state machine for controlling the media reception.

In an embodiment, the creating of the instance of the second reception control state machine comprises when more than one media receptions are available in the communication session, creating one instance of the second reception control state machine for each request for the media reception.

In an embodiment, the receiving of the media transmission notification comprises in response to the received media transmission notification, if the media transmission notification requires acknowledgment, transmitting an acknowledge message to the server; providing, to the user, a notification that the media reception is available; and storing and displaying an identification (ID) and a synchronization source (SSRC) of the external device related to the media transmission notification.

In an embodiment, the transmitting of the media reception request comprises mapping the stored ID and the SSRC of the external device to the instance of the second reception control state machine.

In an embodiment, the method further comprises receiving, from the server, a grant response for the media reception request; in response to the received grant response, if the grant response requires acknowledgement, transmitting an acknowledge message to the server; receiving media data from the external device via the server.

In an embodiment, the method further comprises terminating the instance of the second reception control state machine based on a media reception control message while retaining the instance of the first reception control state machine for the communication session.

In an embodiment, the terminating of the instance of the second reception control state machine comprises receiving, from the server, a media transmission end notification indicating that the media reception is completed; in response to the received media transmission end notification, if the media transmission end notification requires acknowledgement, transmitting an acknowledge message to the server; providing, to the user, a notification that the media reception is completed; and deleting the instance of the second reception control state machine related to the media reception.

In an embodiment, the terminating of the instance of the second reception control state machine comprises receiving, from the server, a rejection response for the media reception request; in response to the received rejection response, if the rejection response requires acknowledgement, transmitting an acknowledge message to the server; providing, to the user, a notification that the media reception is rejected and/or reason for rejecting the media reception request; and deleting the second reception control state machine related to the media reception.

In an embodiment, the transmitting of the media reception request comprises starting a first timer and initializing a first counter to 1. The method further comprises, when a response for the media reception request is received or the media reception request is canceled, stopping the first timer; when the first timer expires, if the first counter is less than a threshold, transmitting the media reception request to the server, restarting the first timer, and increasing the first counter by 1; and if the first counter is greater than or equal to the threshold, providing, to the user, a notification that media reception request timed out and deleting the instance of the second reception control state machine for the media reception.

In an embodiment, the terminating of the instance of the second reception control state machine comprises receiving, from the server, a media reception end request indicating that the media reception is going to be terminated before completed, while receiving media data; in response to the received media reception end request, if the media reception end request requires acknowledgement, transmitting, an acknowledgement message to the server; providing, to the user, a notification that reception of the media data is going to be terminated and/or reason for terminating reception of the media data by the server; transmitting, to the server, a response message for the media reception end request; and deleting the instance of the second reception control state machine related to the media reception.

In an embodiment, the terminating of the instance of the second reception control state machine comprises receiving, from the user, an input for canceling the media reception; and in response to receiving the input, transmitting a media transmission end request for canceling the media reception to the server.

In an embodiment, the transmitting of the media transmission end request comprises starting a second timer and initializing a second counter to 1. The terminating of the instance of the second reception control state machine further comprises, when a response for the media transmission end request is received, stopping the second timer and deleting the instance of the second reception control state machine related to the media reception; when the second timer expires, if the second counter is less than a threshold, transmitting the media transmission end request to the server, restarting the second timer, and increasing the second counter by 1; and if the second counter is greater than or equal to the threshold, deleting the instance of the second reception control state machine for the media reception.

In an embodiment, the terminating of the instance of the second reception control state machine comprises deleting the instance of the second reception control state machine; and if call type is broadcast group call, releasing the established communication session.

In an embodiment, the method further comprises receiving a communication session control message indicating the communication session is going to be released; stopping all media receptions in progress in the communication session; deleting all existing instances of the second reception control state machine in the communication session; and deleting the instance of the first reception control state machine.

Accordingly, provided is an electronic device for controlling media reception. The electronic device comprises a communicator configured to communicate with at least one external device and a server; a memory storing instructions; and at least one processor, operationally coupled to the communicator and the memory. The at least one processor is configured to execute the stored instructions to establish, through the communicator, a communication session between the electronic device and the at least one external device via the server; in response to establishing the communication session, create an instance of a first reception control state machine for controlling multiple media receptions in the communication session; receive, through the communicator from the server, a media transmission notification indicating that a media reception is available from an external device; receive, from a user of the electronic device, an input for permitting the media reception; and in response to receiving the input, transmit, through the communicator to the server, a media reception request permitting the media requesting the reception and creating an instance of a second reception control state machine for controlling the media reception.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely examples. Accordingly, those of ordinary skill in the art will recognize that various changes and modifications of the various embodiments described herein may be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Referring now to the drawings, and more particularly to FIGS. 1A through 4, where similar reference characters denote corresponding features consistently throughout the figures, there are shown various embodiments of the present disclosure.

Figure 1A:
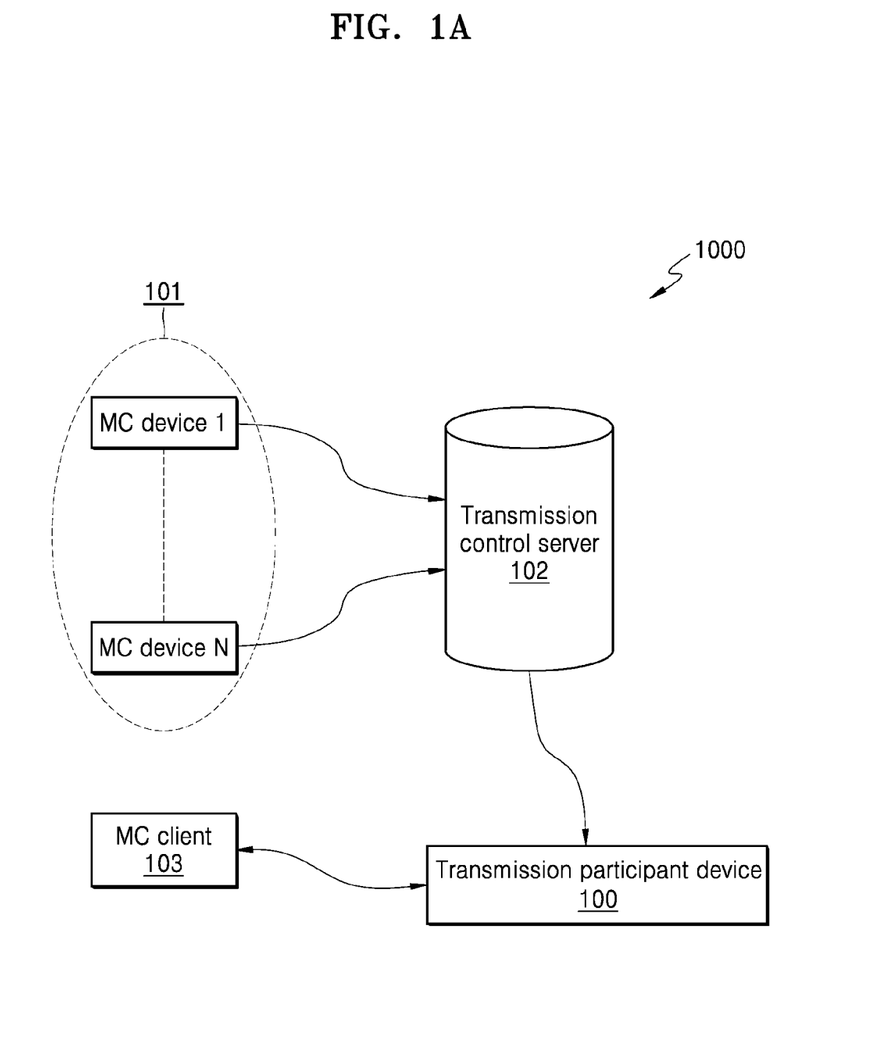
FIG. 1A illustrates a mission critical (MC) video network, according to an embodiment of the disclosure.

FIG. 1A illustrates a mission critical (MC) video network 1000, according to an embodiment of the disclosure. The MC video network 1000 may include a transmission participant device 100, a plurality of MC devices 101, a transmission control server 102, and a MC client 103. The plurality of MC devices 101 and an MC client 103 can be an electronic device such as, for example, but not limited to, a smartphone, a tablet, a smart glass, a smart webcam or a like.

Referring FIG. 1A, the transmission participant device 100 may be a user equipment (UE) for communicating with the plurality of MC devices 101 through the transmission control server 102. The transmission participant device 100 may handle outgoing transmission requests and the incoming video stream invitations and notifications.

In an embodiment, the transmission participant device 100 may establish an MC communication session between the plurality of MC devices 101 via a transmission control server 102. The transmission participant device 100 may create an instance of "transmission participant general reception control state machine" for controlling multiple media receptions in the communication session after the establishment of the MC communication session. The transmission participant device 100 may receive, from the transmission control server 102, a media transmission notification indicating that a media reception is available from at least one of the plurality of MC devices 101. The transmission participant device 100 may receive, from a user of the transmission participant device 100, an input for permitting the media reception. In response to receiving the input, the transmission participant device 100 may transmit a media reception request to the transmission control server 102. The transmission participant device 100 may create at least one instance of a "transmission participant basic reception control state machine" for controlling the media reception when a media reception request is transmitted. The transmission participant device 100 may create the instance of the transmission participant basic reception control state machine to handle reception control messages and a reception controller state to handle at least one of MC media transmission notifications, MC media requests, MC media transmission end notification messages.

The transmission participant device 100 may terminate the instance of transmission participant basic reception control state machine based on the reception control messages. The transmission participant device 100 may enter a release state of the transmission participant general reception control state machine to disconnect the established MC communication session. The transmission participant device 100 may retain the transmission participant general reception control state machine.

In an embodiment, the transmission participant device 100 may receive a media transmission notification from the transmission control server 102 in the MC communication session. The media transmission notification may indicate that a media reception is available from one of the plurality of MC devices 103. The transmission participant device 100 may, if the media transmission notification requires acknowledgment, send a transmission control acknowledge message to the transmission control server 102. The transmission control acknowledge message may include information indicating a message type and a source of the message. The transmission participant device 100 may provide the MC media transmission notification message to the user through a MC client 103. The transmission participant device 100 may store an identification (ID) and a synchronization source SSRC of the MC device 101 related to the media transmission notification messages. The transmission participant device 100 may display the ID and SSRC of the MC device 101 related to the media transmission notification messages. The transmission participant device 100 may retain the reception controller state.

In an embodiment, the transmission participant device 100 may receive a MC media request from the MC client 103 for permission to receive media in the MC communication session. The MC client 103 may generate and send the MC media request based on a user input. Based on receiving the MC media request, the transmission participant device 100 may send a media reception request message for requesting the media reception towards the transmission control server 102. The media reception request message may include at least one of priority of the MC media request and a type of MC media request. The transmission participant device 100 may to create an instance of transmission participant state machine for the basic reception control operation to control the requested media reception in the MC communication session. The transmission participant device 100 may map the ID and SSRC of the MC device 101 related to the media transmission notification to the instance of the transmission participant basic reception control state machine. The transmission participant device 100 may retain the reception controller state.

In an embodiment, when more than one media receptions are available in the communication session, the transmission participant device 100 may receive multiple media transmission notification. When the user permits more than one media receptions, the transmission participant device 100 may transmit multiple media reception requests as many as the number of the permitted media receptions. In this case, the transmission participant device 100 may create one instance of the transmission participant basic reception control state machine for each request for the media reception.

In an embodiment, the transmission control server 102 may grant the media reception request message. The transmission participant device 100 may receive a grant response for the media reception request from the transmission control server 102. If the grant response requires acknowledgement, the transmission participant device 100 may send a transmission control acknowledge message to the transmission control server 102. The transmission control acknowledge message may include information indicating a message type and a source of the message. The transmission participant device 100 may provide a notification message that the media reception request is granted to the user, through the MC client 103. The transmission participant device 100 may receive media data from the MC devices 101 via the transmission control server 102. The media data may be transmitted in Real-time Transport Protocol (RTP) packet.

In an embodiment, the transmission control server 102 may notify the user the end of RTP by sending a transmission end notification to the transmission participant device 100. The transmission participant device 100 may receive the media transmission end notification from the transmission control server 102 in the MC communication session. The media transmission end notification may indicate that the media reception is completed. The transmission participant device 100 may, if the media transmission notification requires acknowledgment, send a transmission control acknowledge message to the transmission control server 102. The transmission control acknowledge message may include information indicating a message type and a source of the message. The transmission participant device 100 may provide notification that Real-time Transport Protocol (RTP) media reception is completed to the user through the MC client 103. the transmission participant device 100 may enter the "terminated" state of transmission participant state machine for the basic reception control operation. The transmission participant device 100 may delete the instance of transmission participant state machine for the basic reception control operation related to the media reception.

In some embodiments, the media reception may be canceled or aborted before completed, even before actually receiving the media data. In an embodiment, the transmission participant device 100 may terminate the media reception based on threshold limit of a first-timer or second-timer expiry. In another embodiment, the transmission participant device 100 may terminate the media reception based on receiving a media reception end notification from the transmission control server 102. In still another embodiment, the transmission participant device 100 may terminate the media reception based on releasing a MC media reception request message by an MC media end button.

In an embodiment, the transmission control server 102 may reject the media reception request from the transmission participant device 100. In this case, the transmission participant device 100 may receive a rejection response for the media reception request from the transmission control server 102. If the rejection response requires acknowledgement, the transmission participant device 100 send a transmission control acknowledge message to the transmission control server 102. The transmission control acknowledge message may include information indicating a message type and a source of the message. The transmission participant device 100 may stop the first-timer. The transmission participant device 100 may notify that the media reception request is rejected and/or the reason for rejecting. The transmission participant device 100 may enter the "terminate" state of transmission participant state machine for the basic reception control operation. The transmission participant device 100 may delete the instance of the transmission participant basic reception control state machine for the media reception.

In an embodiment, the transmission participant device 100 may terminate the media reception by timeout. When transmitting the media reception request, the transmission participant device 100 may start a first timer and initializing a first counter to 1. The first timer is set to a predetermined expiry time. When a response (i.e. a grant response or a reject response) for the media reception request is received or the media reception request is canceled, the transmission participant device 100 may stop the first timer. When the first timer expires, the transmission participant device 100 may determine if the first counter is less than a predetermined threshold. If the first counter is less than the threshold, the transmission participant device 100 may transmit the media reception request to the transmission control server 102 again, restart the first timer, and increase the first counter by 1.

If the first counter is greater than or equal to the threshold, the transmission participant device 100 may provide a media reception request timeout notification to the MC client 103. The transmission participant device 100 may display the media reception request timeout notification. The transmission participant device 100 may enter a "terminated" state of transmission participant state machine for the basic reception control operation. The transmission participant device 100 may delete the second reception control state machine related to the media reception.

In an embodiment, the MC device 101 or the transmission control server 102 may cancel the media reception. In this case, the transmission participant device 100 may receive a media reception end request from the transmission control server 102, while receiving the media data. The media reception end request may indicate that the media reception is going to be terminated by the source (the MC device 101) or the transmission control server 102. If the media reception end request requires acknowledgement, the transmission participant device 100 may transmit a reception control acknowledgement message to the transmission control server 102. The reception control acknowledge message may include information indicating a message type, a source of the message, and the message name. The transmission participant device 100 may provide a notification to the user that reception of the media data is going to be terminated and/or reason for terminating reception of the media data.

The transmission participant device 100 may notify that reception of the media data is going to be terminated and/or the reason for ending the RTP media transmission. The transmission participant device 100 may enter the "terminated" state of transmission participant state machine for the basic reception control operation. The transmission participant device 100 may delete the instance of the transmission participant basic reception control state machine for the media reception.

In an embodiment, the media reception may be canceled by the user of the transmission participant device 100. The transmission participant device 100 may receive a user input for canceling the media reception. Based on receiving the user input, the transmission participant device 100 may send a media reception end request message to cancel the media reception to the transmission control server 102.

In response to sending the media reception end request message, the transmission participant device 100 may stop the first timer. Further, the transmission participant device 100 may initiate the second-timer and initialize a second counter to 1. Further, the transmission participant device 100 may enter a pending reception release state. When a response for the media transmission end request is received from the transmission control server 102, the transmission participant device 100 may stop the second timer and delete the instance of the second reception control state machine related to the media reception. When the second timer expires, the transmission participant device 100 may determine if the second counter is less than a predetermined threshold. If the second counter is less than a threshold, the transmission participant device 100 may transmit the media transmission end request to the transmission control server 102 again, restart the second timer, and increase the second counter by 1.

If the second counter is greater than or equal to the threshold, the transmission participant device 100 may provide a receive media end request timeout notification to the MC client 103. The transmission participant device 100 may display the received media end request timeout notification. The transmission participant device 100 may enter a "terminated" state of transmission participant state machine for the basic reception control operation. The transmission participant device 100 may delete the second reception control state machine related to the media reception.

In an embodiment, when the transmission participant device 100 terminates the instance of the transmission participant state machine for the basic reception control operation, the transmission participant device 100 may enter a "call releasing" state of the transmission participant general reception control state machine and release current communication session if call type is broadcast group call.

In an embodiment, the transmission participant device 100 may receive a communication session control message indicating the communication session is going to be released. The communication session control message may be sent from the transmission control server 102 or the MC client 103. Based on receiving the communication session control message, the transmission participant device 100 may enter a "call releasing" state of the transmission participant general reception control state machine. The transmission participant device 100 may stop all media receptions in progress in the communication session. The transmission participant device 100 may delete all existing instances of the second reception control state machine in the communication session. The transmission participant device 100 may delete the instance of the first reception control state machine.

Figure 1B:
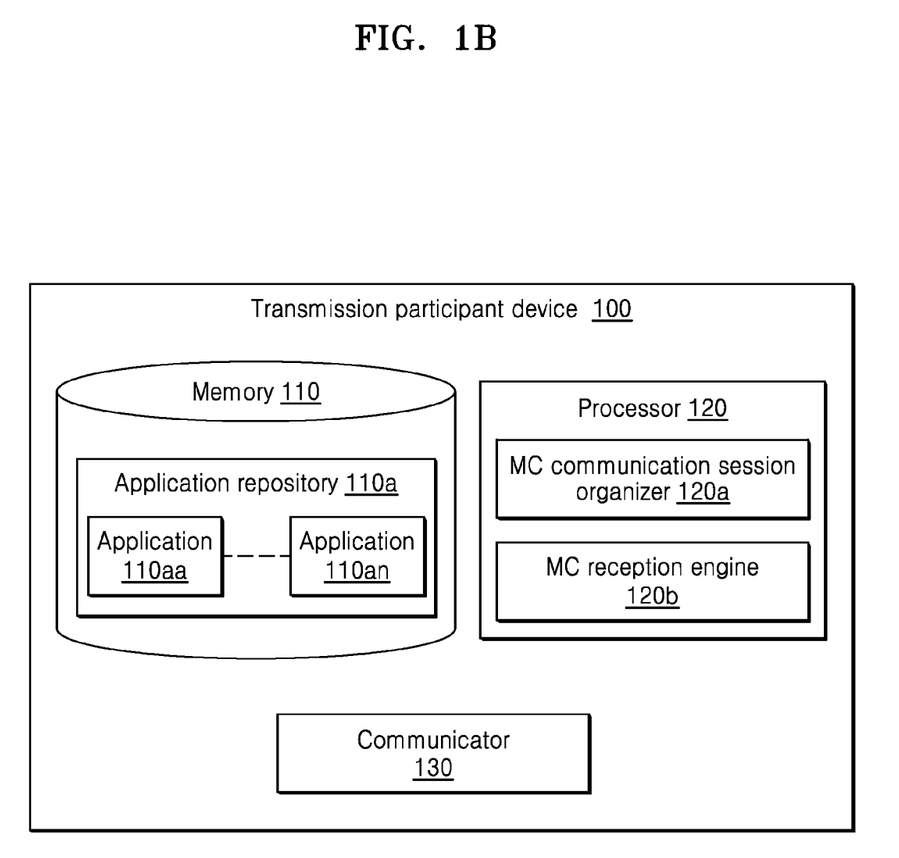
FIG. 1B illustrates a block diagram of a transmission participant device for controlling video reception in the MC video network, according to an embodiment of the disclosure.

FIG. 1B illustrates a block diagram of the transmission participant device 100 for controlling video reception in the MC video network 1000, according to an embodiment of the disclosure. In an embodiment, the transmission participant device 100 may include a memory 110, at least one processor 120, and a communicator 130.

The memory 110 may store instructions to be executed by the processor 120. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 110 is non-movable. In some examples, the memory 110 can be configured to store larger amounts of information than the memory. In certain examples, a non-transitory storage medium may store data that can, over time, change (e.g., in Random Access Memory (RAM) or cache). In an embodiment, the memory 110 can be an internal storage unit or it can be an external storage unit of transmission participant device 100, a cloud storage, or any other type of external storage.

The memory 110 may include an application repository 110*a*. The application repository 110*a* is configured to store MC video of different application associated with media (e.g. camera application for video-audio record, recorder application for audio record) control of the transmission participant device 100. The application repository 110*aa* to 110*an* can be, for example, but not limited to a camera application, a social media application, and a recorder application.

The processor 120 is operationally coupled with the memory 110, and the communicator 130. The processor 120 is configured to execute instructions stored in the memory 110 and to perform various processes. In an embodiment, the processor 120 may include an MC communication session organizer 120a, and MC reception engine 120b.

The MC communication session organizer 120a may establish the MC communication session with the plurality of MC devices 101 through the transmission control server 102. The MC communication session organizer 120a may receive a communication session control message for call release from application and signaling layer. In response to receiving the communication session control message for call release, the MC communication session organizer 120a may release all resources including any running timers associated with the MC communication session. Further, the MC communication session organizer 120a may terminate all instances of the transmission participant state machine for basic reception control operation. Further, the MC communication session organizer 120a may initiate a "start-stop" state of the transmission participant state machine for general reception control operation and terminate the current instance of the transmission participant state machine for general reception control operation.

The MC reception engine 120b may create an instance of the transmission participant state machine for basic reception control operation to control reception control messages. The MC reception engine 120b may enter a "reception controller" state of the transmission participant state machine for general reception control operation to handle at least one of MC media transmission notifications, MC media transmission end notification and MC media requests from the MC devices 101 or transmission control server 102 to receive or end media transmissions in the MC communication session. The MC reception engine 120b may automatically configure into the "reception controller" state.

The MC reception engine 120b may receive MC media transmission notifications from the MC devices 101 in the MC communication session. The MC reception engine 120b may retain the "reception controller" state of the transmission participant state machine for general reception control operation.

In response to receiving the MC media transmission notification, the MC reception engine 120b may send the transmission control acknowledge message, including information indicating the message type and a source of the message. Further, the MC reception engine 120b may provide the MC media transmission notification messages to the MC client 103. Further, the MC reception engine 120b may store the ID and SSRC of the MC devices 101 related to the MC media transmission notification messages. Further, the MC reception engine 120b may display the ID and SSRC of the MC devices 101.

The MC reception engine 120b may receive MC media requests for MC media transmission notification from the MC devices 101 in the MC communication session. The MC reception engine 120b may send the media reception request message towards the transmission control server 102 based on at least one of priority of the MC media request and type of MC media request. In response to sending the media reception request message, the MC reception engine 120b may create the instance of the transmission participant state machine for basic reception control operation. Further, the MC reception engine 120b may map the ID and SSRC of the MC device 101 to the instance of the transmission participant state machine for basic reception control operation.

The MC reception engine 120b may receive a grant response for the media reception request from the transmission control server 102. In response to receiving the grant response, The MC reception engine 120b may send a transmission control acknowledge message to the transmission control server 102. The transmission control acknowledge message may include information indicating a message type and a source of the message. The MC reception engine 120b may provide a notification message that the media reception request is granted to the MC client 103.

The MC reception engine 120b may terminate transmission participant state machine for basic reception control operation based on, for example, threshold limit of the first-timer expiry, receiving an input for cancelling the media reception request message from the MC client 103 by pressing the MC media end button, receiving a rejecting response for the media reception request message, receiving a MC Media end request from the transmission control server 102, and receiving a media transmission end notification from the transmission control server 102.

The MC reception engine 120b may receive a user input for canceling the media reception. The MC reception engine 120b may send the media reception end request message to cancel the media reception to the transmission control server 102. In response to sending the media reception end request message, the MC reception engine 120b may remove indication that the participant is overriding without revoke if the indication is stored. The MC reception engine 120b may stop the first timer. The MC reception engine 120b may initiate the second timer and initialize a second counter to 1. The MC reception engine 120b may enter a "pending reception release" state of the transmission participant basic reception control state machine. Further, in the "pending reception release" state, the MC reception engine 120b may enter to a "terminated" state the transmission participant basic reception control state machine based on threshold limit of the second timer expiry or based on a media reception end response message received from the transmission control server 102

The MC reception engine 120b may receive a MC media rejected response for the media reception request from the transmission control server 102. In response to receiving the MC media rejected response, the MC reception engine 120b may send a transmission control acknowledge message. Further, the MC reception engine 120b may send a rejected receive media response notification message to the MC client 103 and enter to the "terminated" state of transmission participant state machine for the basic reception control operation.

The MC reception engine 120b may receive a MC media end requests indicating that the media reception is going to be terminated, from the transmission control server 102. In response to receiving the MC media end requests, the MC reception engine 120b may send transmission control acknowledge message. Further, the MC reception engine 120b may provide a reception end notification to the MC client 103 and enter to the "terminated" state of transmission participant state machine for basic reception control operation.

The MC reception engine 120b may receive a transmission end notification message indicating that the media reception is completed from the transmission control server 102. In response to receiving the transmission end notification message, the MC reception engine 120b may provide transmission end notification to the MC client 103 and enter the "terminate" state of transmission participant state machine for basic reception control operation.

The MC reception engine 120b in the "terminated" state may terminate the instance of the transmission participant state machine for basic reception control operation by deleting the instance, and for the broadcast group calls, enter the "call releasing" state of the transmission participant state machine for general reception control operation.

The communicator 130 is configured for communicating internally between internal hardware components and with external devices via one or more networks.

Although the FIG. 1B shows various hardware components of the transmission participant device 100 but it is to be understood that other embodiments are not limited thereon. In other embodiments, the transmission participant device 100 may include less or more number of components. Further, the labels or names of the components are used only for illustrative purpose and does not limit the scope of the present disclosure. One or more components can be combined together to perform same or substantially similar function to handle multiple video reception in the MC video network 1000 comprising the plurality of MC devices 101.

Figure 1C:
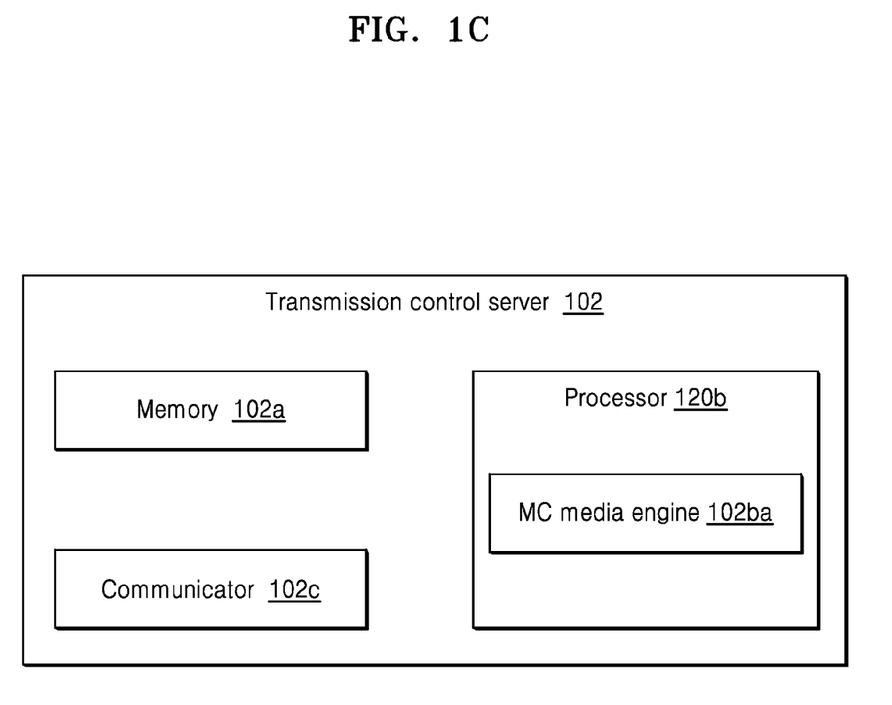
FIG. 1C illustrates a block diagram of a transmission control server for controlling video reception in the MC video network, according to an embodiment of the disclosure.

FIG. 1C illustrates a block diagram of the transmission control server 102 for controlling video reception in the MC video network 1000, according to an embodiment of the disclosure.

In an embodiment, the transmission control server 102 may include a memory 102a, at least one processor 102b, and a communicator 102c. The functionality of the memory 102a, the communicator 102c same as the memory 110 and the communicator 130.

The processor 102b includes a MC media engine 102ba. The MC media engine 102ba may send a media transmission notification indicating that a media reception is available from at least one of the plurality of MC devices 101 to the transmission participant device 100. The MC media engine 102ba may receive a media reception request or a media reception end request from the transmission participant device 100, as a response of the media transmission notification. The MC media engine 102ba may send a grant response or a rejection response for the media reception request to transmission participant device 100. The MC media engine 102ba may notify end of RTP by sending a transmission end notification indicating that the media reception is completed or a media reception end request indicating that the media reception is going to be terminated to the transmission participant device 100. The MC media engine 102ba may receive a media reception end request message to cancel the media reception from the transmission participant device 100 and send back a response for the media transmission end request.

Figure 2:
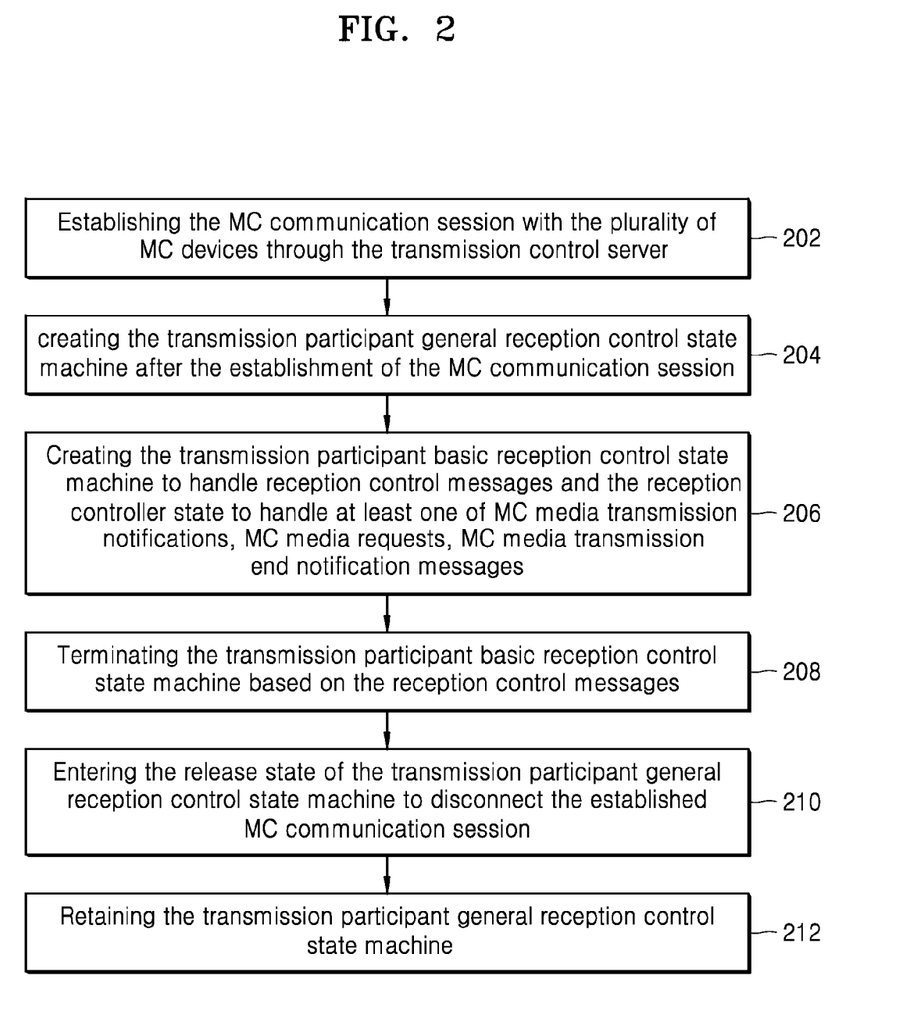
FIG. 2 is a flow diagram illustrating a method for controlling video reception in the MC video network, according to an embodiment of the disclosure.

FIG. 2 is a flow diagram 200 illustrating a method for controlling video reception in the MC video network 1000, according to an embodiment of the disclosure. The operations 202-212 are performed by the transmission participant device 100.

Referring FIG. 2, at operation 202, the transmission participant device 100 may establish the MC communication session with the plurality of MC devices 101 through the transmission control server 102. At operation 204, the transmission participant device 100 may create a transmission participant general reception control state machine after the establishment of the MC communication session.

At operation 206, the transmission participant device 100 may create the transmission participant basic reception control state machine to handle reception control messages and the reception controller state to handle at least one of MC media transmission notifications, MC media requests, MC media transmission end notification messages.

In an embodiment, the transmission participant device 100 may receive, from the transmission control server 102, a media transmission notification indicating that a media reception is available from at least one of the plurality of MC devices 101. The transmission participant device 100 may receive, a user input for permitting the media reception. In response to receiving the user input, the transmission participant device 100 may transmit a media reception request requesting the reception to the transmission control server 102. In response to transmitting the media reception request, the transmission participant device 100 may create at least one instance of the transmission participant basic reception control state machine for controlling the media reception when a media reception request is transmitted.

At operation 208, the transmission participant device 100 may terminate the transmission participant basic reception control state machine based on the reception control messages. The reception control messages may include the transmission end notification, timeout of a first timer or second timer, a rejection response for the media reception request, and a media reception end request.

At operation 210, the transmission participant device 100 may enter the "call release" state of the transmission participant general reception control state machine to disconnect the established MC communication session. The transmission participant device 100 may retain the transmission participant general reception control state machine at operation 212.

The various actions, acts, blocks, steps, or the like in the flowchart referring to FIG. 2 may be performed in the order presented, in a different order or simultaneously. Further, in some embodiments, some of the actions, acts, blocks, steps, or the like may be omitted, added, modified, skipped, or the like without departing from the scope of the present disclosure. For example, operations 208 to 212 may be not performed.

Figure 3A:
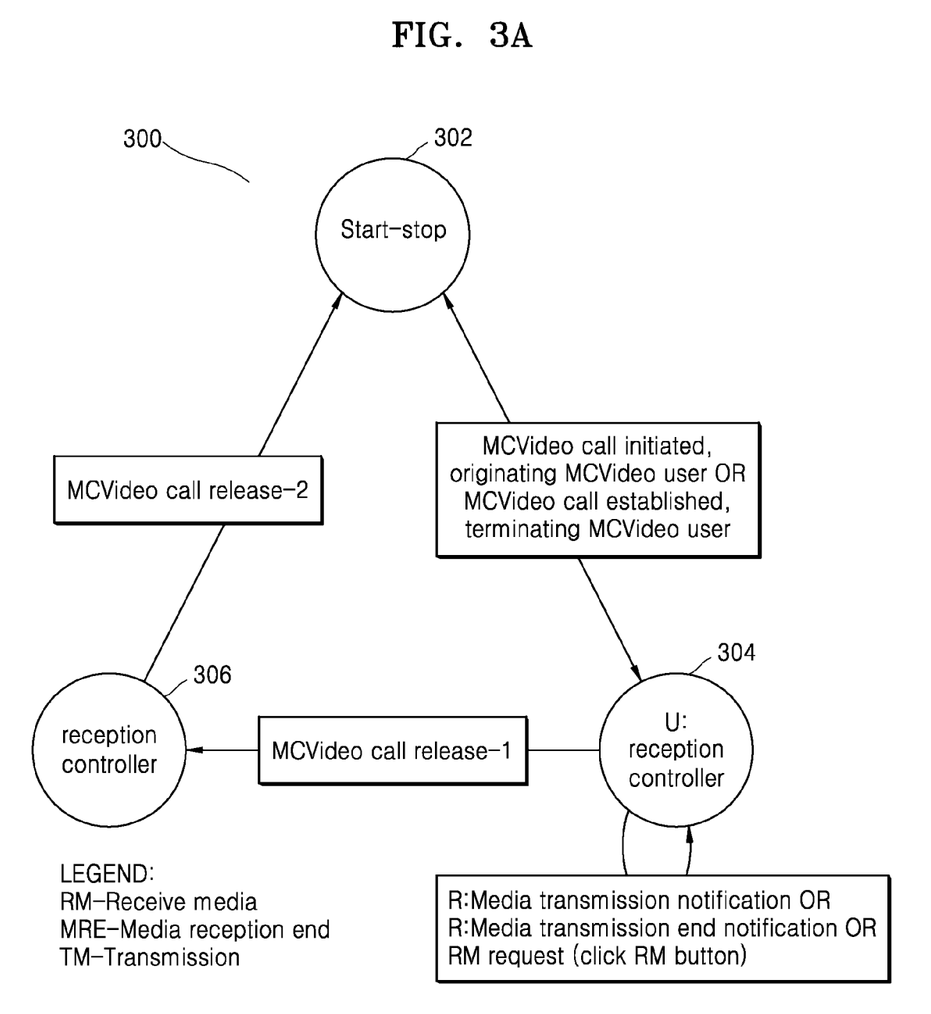
FIG. 3A illustrates a state machine of the transmission participant for general reception control operation, according to an embodiment of the disclosure.

FIG. 3A illustrates a state machine 300 of the transmission participant for general reception control operation, according to an embodiment of the disclosure.

Referring FIG. 3A, 'start-stop' state 302 is part of 'transmission participant state machine 300 for general reception control operation'. When a new instance of the 'transmission participant state machine 300 for general reception control operation' is initiated, before any reception control related input is applied, the state machine is in the 'start-stop' state 302. Similarly when the call is released the state machine (i.e. 'transmission participant state machine 300 for general reception control operation') returns to the 'start-stop' state 302.

When the MCVideo call is established, each transmission participant devices 100 (i.e. originating and terminating transmission participant device) may create an instance of the 'transmission participant state machine 300 for general reception control operation' and enter the 'U: reception controller' state 304. From the transmission participant device 100 perspective, the MCVideo call may be established when the application and signaling plane sends the SIP OK response.

'U: reception controller' state 304 is part of the 'transmission participant state machine 300 for general reception control operation'. The transmission participant device 100 may handle the incoming media transmission notifications from the transmission control server 102 and the user's requests to receive or cancel media transmissions.

Upon receiving the 'media transmission notification' from the transmission control server 102 ('R: media transmission notification'), the transmission participant device 100 may send the transmission control acknowledge message if the first bit in the subtype of the media transmission notification message indicates that acknowledgment is required (for example, set to '1'). The transmission control acknowledge message may include the message type field set to indicate 'media transmission notification' and the source field set to indicate that the transmission participant is the source.

Further, the transmission participant device 100 may provide a media transmission notification to the MC client 103, store the user ID and the SSRC of the MC device 101 transmitting the media, display the details of the incoming media, and remain in the 'U: reception controller' state 304.

Upon receiving an indication from the user to request permission to receive media ('click video receive button'), the transmission participant device 100 may send a 'media reception request' message to transmission control server 102. If a different priority than the normal priority is required, the 'receive media request' message may include the reception priority field with the priority not higher than negotiated with the transmission control server 102. If the 'receive media request' is a broadcast group call, system call, emergency call or an imminent peril call, the 'receive media request' message may include a transmission indicator field indicating the relevant call types.

Figure 3B:
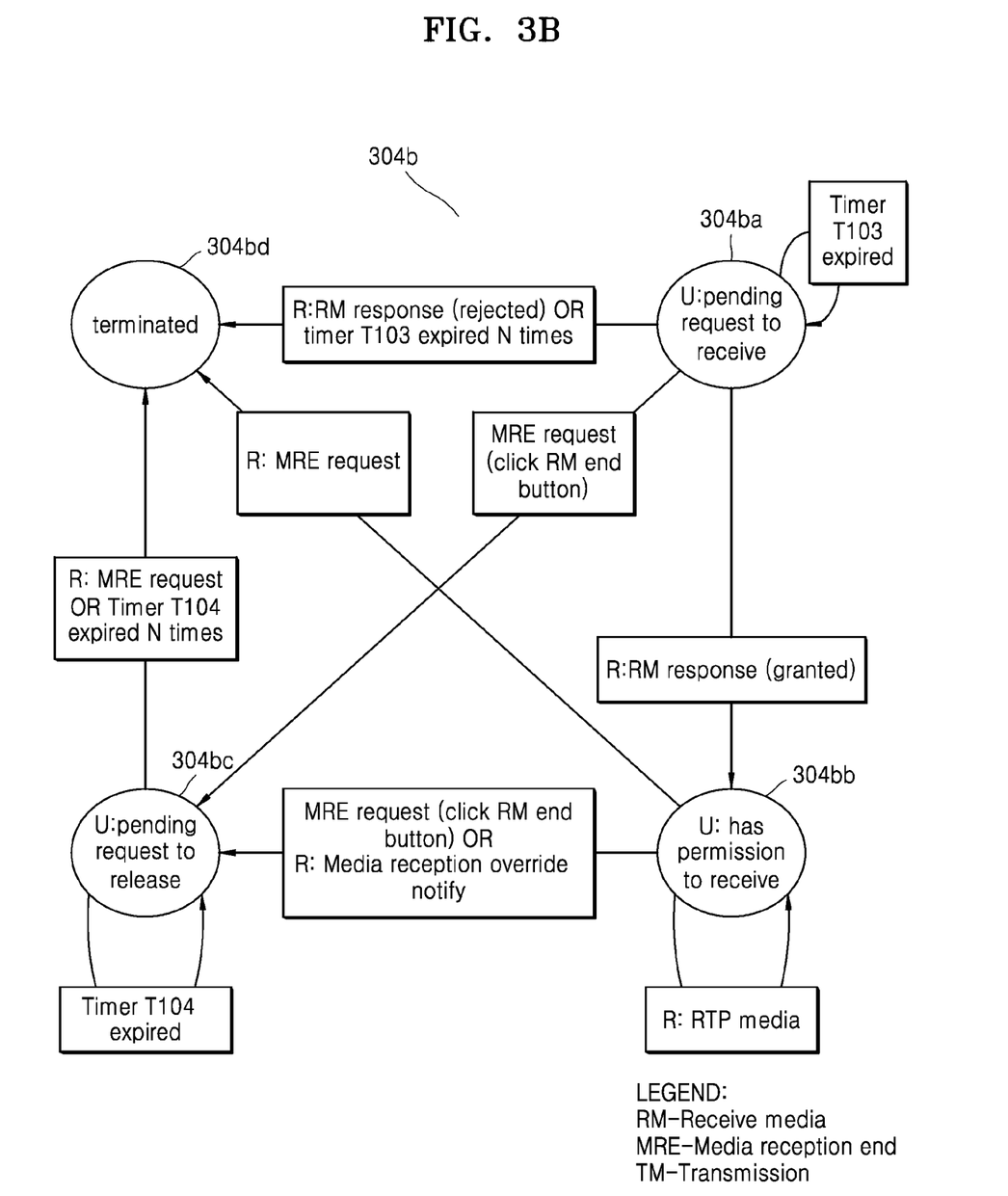
FIG. 3B illustrates a state machine of the transmission participant for basic reception control operation, according to an embodiment of the disclosure.

Further, the transmission participant device 100 may create an instance of the 'transmission participant state machine 304*b* for basic reception control operation' as referred in FIG. 3B. Further, the transmission participant device 100 may map the stored user ID and the SSRC of the MC device 101 transmitting the media with the instance of 'transmission participant state machine 304*b* for basic reception control operation', and remain in the 'U: reception controller' state 304.

Upon receiving the 'media transmission end notification' message ('R: transmission end notify'), the transmission participant device 100 may inform the MC client 103 about the media transmission ended by another MC device 101, delete the instance of 'transmission participant state machine 304*b* for basic reception control operation' and remain in the 'U: reception controller' state 304.

Upon receiving the 'MCVideo call release step 1 request' from the application and signaling plane when the MCVideo call is going to be released or when the transmission participant is leaving the MCVideo call, the transmission participant device 100 may stop receiving reception control messages, request the MCVideo client (i.e. the MC client 103) to stop receiving real-time transport protocol (RTP) media packets, and enter a 'call releasing' state 306.

The 'call releasing' state 306 is part of the transmission participant state machine 300 for general reception control operation. The transmission participant device 100 may be in this state while waiting for the application and signaling plane to finalize the disconnection of the MCVideo call.

Upon receiving an 'MCVideo call release step 2 request' from the application and signaling, the transmission participant device 100 may release all resources including any running timers associated with the MCVideo call, terminate all instances of the 'transmission participant state machine 304*b* for basic reception control operation', enter the 'start-stop' state 302, and terminate the current instance of the 'transmission participant state machine 300 for general reception control operation'.

FIG. 3B illustrates a state machine 304*b* of the transmission participant for basic reception control operation, according to an embodiment of the disclosure.

Referring FIG. 3B, 'U: pending request to receive' state 304*ba* is part of the 'transmission participant state machine for basic reception control operation'. The transmission participant device 100 may be in this state when the transmission participant device 100 is waiting to response to the 'receive media request' message. The transmission participant device 100 can cancel the 'receive media request' at any time, even before actually receiving response to the 'receive media request' message. Further, the transmission participant device 100 may start the first timer and initialize the first counter to 1 on entering in this state.

Upon receiving the 'rejected' response for the 'receive media request' message, the transmission participant device 100 may send a transmission control acknowledge message if the first bit in the subtype of the receive media response message indicates that acknowledgment is required (for example, set to '1'). The transmission control acknowledge message may include the message type field set to indicate 'receive media rejected' and the source field set to indicate that the transmission participant is the source. Further, the transmission participant device 100 may provide a receive media rejected notification to the MC client 103. Further, the transmission participant device 100 may display reason of the rejection to the MC client 103 using information in the reject cause field of the 'rejected' response. Further, the transmission participant device 100 may stop the first timer and enter to a 'terminated' state 304*bd*.

On expiry of the first timer by times less than the upper limit of the first counter which the first timer is allowed to expire, the transmission participant device 100 may send the 'receive media request' message towards the transmission control server again, restart the first timer, increment the first counter by 1, and remain in the 'U: pending request to receive' state 304*ba*.

When the first timer expires by the upper limit of the first counter, the transmission participant device 100 may provide a receive media request timeout notification to the MC client 103 and enter to the 'terminated' state 304*bd*.

Upon receiving a granted response for the 'receive media request' message from the transmission control server 102 ('R: RM response (granted)'), the transmission participant device 100 may send the transmission control acknowledge message if the first bit in the subtype of the response indicates that acknowledgment is required (for example, set to '1'). The transmission control acknowledge message may include the message type field set to indicate 'receive media response' and the source field set to indicate that the transmission participant is the source.

Further, the transmission participant device 100 may provide receive media success notification to the MC client 103. Further, the transmission participant device 100 stop the first timer and enter the 'U: has permission to receive' state 304*bb*.

Upon receiving an indication from the MC client 103 to cancel the receive media request, the transmission participant device 100 may send a 'media reception end request' message towards the transmission control server 102. Further, the 'media reception end request' message may include the SSRC of the MC device 101 transmitting the media.

Further, the transmission participant device 100 may remove the indication that the participant is overriding without revoke if this indication is stored. Further, the transmission participant device 100 may stop the first timer. Further, the transmission participant device 100 start the second timer and initialize the second counter to 1. Further, the transmission participant device 100 may enter in a 'U: pending reception release' state 304*bc*.

'U: has permission to receive' state 304*bb* is part of the 'transmission participant state machine 304*b* for basic reception control operation'. The transmission participant device 100 may be in this state when the MC client 103 is permitted to receive media. Further, the transmission participant device 100 can terminate the reception of the media at any time, even before actually receiving any media.

The transmission participant device 100 may receive media data from the source (at least one MC devices 101) via the transmission control server 102. The media data may be transmitted in Real-time Transport Protocol (RTP) packet.

Upon receiving a 'media reception end request' message ('Click video reception end button') from the MC client 103 to end the media reception, the transmission participant device 100 may send the 'media reception end request' message towards the transmission control server 102. Further, the 'media reception end request' message may include the SSRC of the MC device 101 transmitting the media.

Further, the transmission participant device 100 may remove the indication that the participant is overriding without revoke if this indication is stored. Further, the transmission participant device 100 may start the second timer T104, initialize the second counter to 1, and enter the 'U: pending reception release' state 304*bc*.

Upon receiving a 'media reception end request' message ('R: MRE request') from the transmission control server 102, the transmission participant device 100 may send a reception control acknowledge message if the first bit in the subtype of the media reception end request message indicates that acknowledgment is required (for example, set to "1"). The reception control acknowledge message may include the message type field set to indicate 'media reception end request', the source field set to indicate that the transmission participant is the source.

Further, the transmission participant device 100 may inform the MC client 103 that the receiving media is being ended. Further, the transmission participant device 100 may send information to the MC client 103 about the reason for ending the received media. Further, the transmission participant device 100 may request the MC client 103 to discard any remaining buffered RTP media packets and stop displaying. Further, the transmission participant device 100 may send a 'media reception end response' message towards the transmission control server 102. Further, the transmission participant device 100 may provide a media reception end notification to the MC client 103. Further, the transmission participant device 100 may enter in the 'terminated' state 304*bd*.

'U: pending reception release' state 304*bc* is part of the 'transmission participant state machine 304*b* for basic reception control operation'. The transmission participant device 100 may be in this state when the transmission participant is waiting for response to a 'MRE request' message transmitted from the transmission participant device 100 to the transmission control server 102.

On expiry of the second timer by times less than the upper limit of the second counter which the second timer is allowed to expire, the transmission participant device 100 may send the 'MRE request' message towards the transmission control server again, restart the second timer, increment the second counter by 1, and remain in the 'U: pending reception release' state 304*bc*.

When the second timer expires by the upper limit of the second counter, the transmission participant device 100 may provide a media reception end request timeout notification to the MC client 103 and enter to the 'terminated' state 304*bd*.

Upon receiving the 'media reception end response' message from the transmission control server 102 ('R: MRE response'), the transmission participant device 100 may send a transmission control acknowledge message if the first bit in the subtype of the MRE response message indicates that acknowledgment is required (for example, set to '1'). The transmission control acknowledge message may include the message type field set to indicate 'media reception end response', the source field set to indicate that the transmission participant is the source.

Further, the transmission participant device 100 may provide a media reception end notification to the MC client 103. Further, the transmission participant device 100 may stop the second timer, and enter in the 'terminated' state 304*bd*.

'U: terminated' state 304*bd* is part of the 'transmission participant state machine 304*b* for basic reception control operation'. On entering this state, the transmission participant device 100 may delete the instance of this basic reception control state machine. Further, if the session was initiated as a broadcast group call, the transmission participant device 100 may indicate to the 'transmission participant state machine 300 for general reception control operation' to move to 'call releasing' state 306.

Figure 4:
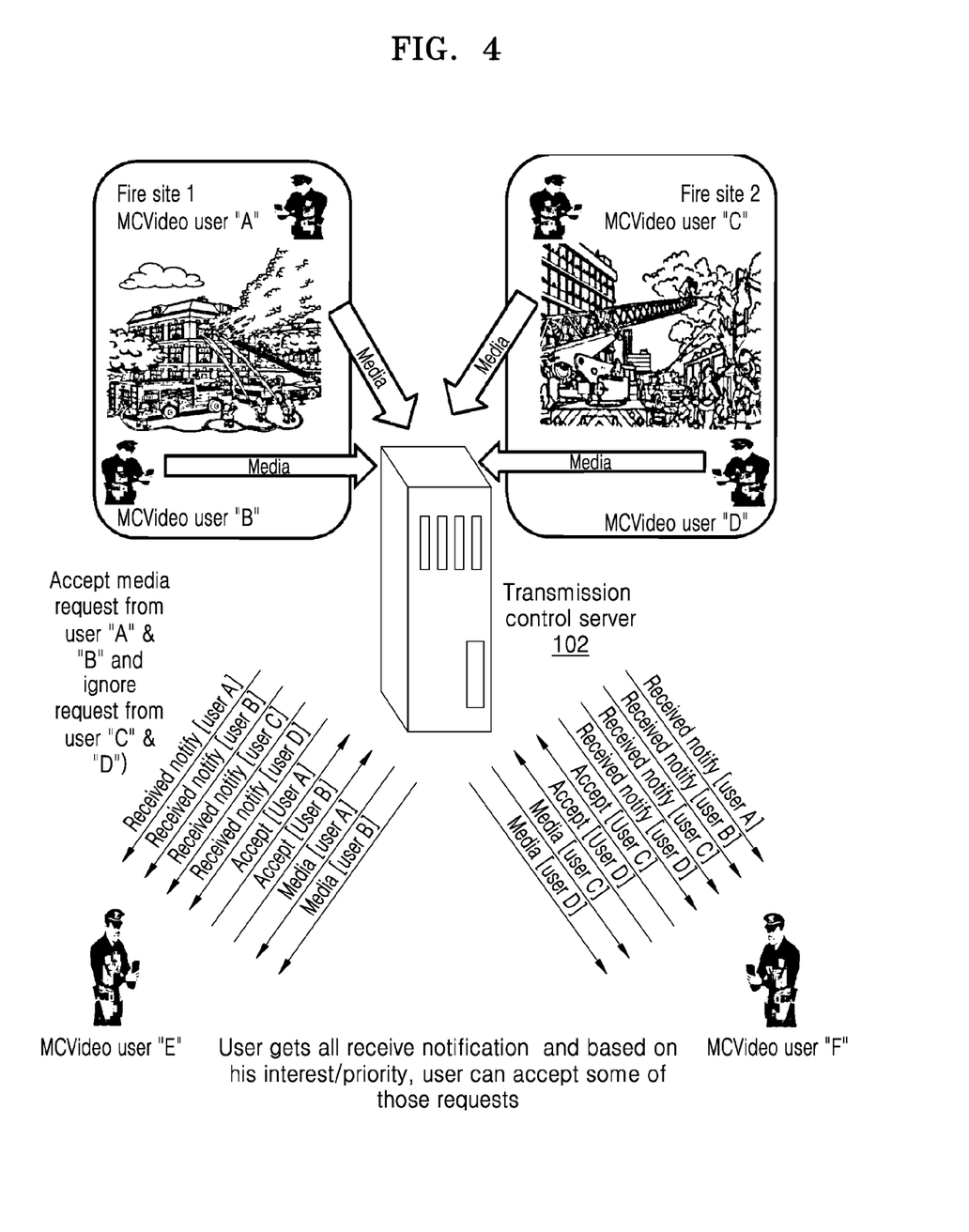
FIG. 4 is an example illustrating various operations for controlling multiple video reception in the MC video network, according to an embodiment of the disclosure.

FIG. 4 is an example illustrating various operations for handling multiple video receptions in the MC video network 1000, according to an embodiment of the disclosure.

Referring FIG. 4, there are six users namely A, B, C, D, E, and F who are part of a fire group. The user A-D are example of the plurality of MC devices 101 transmitting media and the user E and F are example of the transmission participant devices 100 receiving media. The user A-F are communicating in a communication session established between the MC devices 101, the transmission control server 102, and the MC clients 103. The user A and B are trying to address fire situation at site-1 and the user C and D are trying to address fire situation at site-2. Each of them is capturing video from different angle/place. Further, the user E has responsibility to support fire at site-1, so the user E accepts incoming media transmission notification from the user A and B and ignores media transmission notification from the user C and D.

In other word, the transmission participant device 100 of the user E may send media reception requests for media receptions transmitted from user A and B. Each requested media reception may be independently controlled by separate instance of the transmission participant state machine for basic reception control operation. Therefore, user E may receive different videos from user A and B simultaneously, and even if one of the media receptions from user A and B is ended or canceled, the remaining media reception can be maintained.

Likewise, the user F has responsibility to support fire at site-2, so the user F accepts incoming request from the user C and D and ignores requests from the user A and B.

The embodiments disclosed herein use the term 'video' to refer to a video which may comprise of audio also along with the video.

The embodiments disclosed herein can be implemented using at least one software program running on at least one hardware device and performing network management functions to control the elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal for controlling multiple media streams in a wireless communication system, the method comprising:

receiving a real time transport protocol (RTP) media;

transmitting, to a transmission control server, a media reception end (MRE) request message;
starting a first timer and incrementing a first counter;
remaining in a pending reception release state, when the first timer is running,
wherein the terminal in the pending reception release state is waiting for a response to the MRE request message;
receiving the response to the MRE request message;
transmitting a transmission control acknowledgement message, when an acknowledgement is required;
providing a media reception end notification;
stopping the first timer; and
entering a terminated state,
wherein the terminal enters the terminated state, when the first timer expires by an upper limit of the first counter.

2. The method of claim 1, further comprising:
receiving an indication to request permission to receive the RTP media;
transmitting a receive media request message to the transmission control server;
creating an instance for a basic reception control operation;
mapping a user ID and a synchronization source (SSRC) with the instance for the basic reception control operation; and
remaining in a reception controller state.

3. The method of claim 2, wherein the instance for the basic reception control operation is deleted in the terminated state.

4. The method of claim 2, wherein the receive media request message includes a reception priority field with a priority not higher than negotiated with the transmission control server, in case that a different priority than a normal priority is required, and
wherein the receive media request message includes a transmission indicator field indicating relevant call types, in case that a call type of the receive media request message is a broadcast call, system call, emergency call or an imminent peril call.

5. The method of claim 2, further comprising:
entering a pending request to receive state, when the terminal is waiting for a response to the receive media request message; and
starting a second timer and initializing a second counter to 1.

6. The method of claim 5, further comprising:
receiving a rejected response for the receive media request message;
transmitting a transmission control acknowledgement message, when an acknowledgement for the rejected response is required;
providing a media rejected notification;
controlling to stop the second timer; and
entering the terminated state.

7. The method of claim 6, further comprising:
receiving an indication to cancel the receive media request message;
stopping the second timer;
starting the first timer and initializing the first counter to 1; and
entering the pending reception release state.

8. The method of claim 1, further comprising:
when a session is initiated as a broadcast group call and the terminal is in the terminated state, indicating to a state machine for a general reception control operation to move to a call releasing state.

9. A terminal for controlling multiple media streams in a wireless communication system, the terminal comprising:
a transceiver; and
at least one processor coupled with the transceiver and configured to:
receive a real time transport protocol (RTP) media;
transmit, to a transmission control server, a media reception end (MRE) request message;
start a first timer and incrementing a first counter;
remain in a pending reception release state, when the first timer is running,
wherein the terminal in the pending reception release state is waiting for a response to the MRE request message;
receive the response to the MRE request message;
transmit a transmission control acknowledgement message, when an acknowledgement is required;
provide a media reception end notification;
stop the first timer; and
enter a terminated state,
wherein the terminal enters the terminated state, when the first timer expires by an upper limit of the first counter.

10. The terminal of claim 9, wherein the at least one processor is further configured to:
receive an indication to request permission to receive the RTP media;
transmit a receive media request message to the transmission control server;
create an instance for a basic reception control operation;
map a user ID and a synchronization source (SSRC) with the instance for the basic reception control operation; and
remain in a reception controller state.

11. The terminal of claim 10, wherein the instance for the basic reception control operation is deleted in the terminated state.

12. The terminal of claim 10, wherein the receive media request message includes a reception priority field with a priority not higher than negotiated with the transmission control server, in case that a different priority than a normal priority is required, and
wherein the receive media request message includes a transmission indicator field indicating relevant call types, in case that a call type of the receive media request message is a broadcast call, system call, emergency call or an imminent peril call.

13. The terminal of claim 10, wherein the at least one processor is further configured to:
enter a pending request to receive state, when the terminal is waiting for a response to the receive media request message, and
start a second timer and initializing a second counter to 1.

14. The terminal of claim 13, wherein the at least one processor is further configured to:
receive a rejected response for the receive media request message,
transmit a transmission control acknowledgement message, when an acknowledgement for the rejected response is required,
provide a media rejected notification,
control to stop the second timer, and
enter the terminated state.

15. The terminal of claim 14, wherein the at least one processor is further configured to:
receive an indication to cancel the receive media request message, stop the second timer,
start the first timer and initializing the first counter to 1, and
enter the pending reception release state.

16. The terminal of claim 9, wherein at least one processor is further configured to:
when a session is initiated as a broadcast group call and the terminal is in the terminated state, indicate to a state machine for a general reception control operation to move to a call releasing state.

* * * * *